United States Patent
Liu et al.

(10) Patent No.: US 10,783,651 B2
(45) Date of Patent: Sep. 22, 2020

(54) THREE-DIMENSIONAL RECONSTRUCTION METHOD AND DEVICE BASED ON MONOCULAR THREE-DIMENSIONAL SCANNING SYSTEM

(71) Applicant: Shining 3D Tech Co., Ltd., Zhejiang (CN)

(72) Inventors: Zengyi Liu, Zhejiang (CN); Wenbin Wang, Zhejiang (CN); Xiaobo Zhao, Zhejiang (CN)

(73) Assignee: Shining 3D Tech Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/081,958

(22) PCT Filed: Oct. 24, 2017

(86) PCT No.: PCT/CN2017/107506
§ 371 (c)(1),
(2) Date: Sep. 4, 2018

(87) PCT Pub. No.: WO2019/015154
PCT Pub. Date: Jan. 24, 2019

(65) Prior Publication Data
US 2019/0392598 A1    Dec. 26, 2019

(30) Foreign Application Priority Data
Jul. 17, 2017 (CN) .......................... 2017 1 0581213

(51) Int. Cl.
*G06T 7/521* (2017.01)
*G06T 7/586* (2017.01)
(Continued)

(52) U.S. Cl.
CPC ............ *G06T 7/521* (2017.01); *G01B 11/002* (2013.01); *G01B 11/2504* (2013.01);
(Continued)

(58) Field of Classification Search
CPC ..................................................... G06T 7/521
(Continued)

(56) References Cited

U.S. PATENT DOCUMENTS 7,440,590 B1 * 10/2008 Hassebrook ....... G01B 11/2513
345/582
9,251,590 B2 * 2/2016 Sharp ..................... A63F 13/00
(Continued)

FOREIGN PATENT DOCUMENTS

| CN | 101697233 A | 4/2010 |
| CN | 102999939 A | 3/2013 |

(Continued)

OTHER PUBLICATIONS

Luo, Cong; <The three dimensional reconstruction based on the line structured light>;Oct. 15, 2015.
(Continued)

*Primary Examiner* — Ricky Ngon
(74) *Attorney, Agent, or Firm* — Gang Yu (57) ABSTRACT

A three-dimensional reconstruction method and device based on a monocular three-dimensional scanning system is provided. The method includes: a depth map of a measured object is collected by using the invisible structured light scanning component, and the depth map is converted into a three-dimensional data point set, and the three-dimensional data point set includes a plurality of three-dimensional points; a target light plane equation corresponding to a target three-dimensional point is determined in the plurality of three-dimensional points; the target three-dimensional point is projected onto a modulated multi-line stripe image, and a target stripe corresponding to the target light plane equation is determined in the modulated multi-line stripe image; and a three-dimensional point reconstructed by the target stripe, in a camera coordinate system is obtained according to the
(Continued)

target light plane equation and center coordinates of the target stripe.

10 Claims, 3 Drawing Sheets

(51) Int. Cl.
*G06T 7/80* (2017.01)
*G01B 11/00* (2006.01)
*G01B 11/25* (2006.01)
*G01B 21/04* (2006.01)

(52) U.S. Cl.
CPC ........ *G01B 11/2513* (2013.01); *G01B 21/042* (2013.01); *G06T 7/586* (2017.01); *G06T 7/85* (2017.01); *G06T 2207/10028* (2013.01)

(58) Field of Classification Search
USPC ........................................................ 702/159
See application file for complete search history.

(56) References Cited

U.S. PATENT DOCUMENTS

| | | | |
|---|---|---|---|
| 10,271,039 B2* | 4/2019 | Tubic | G06K 9/4609 |
| 10,282,855 B2* | 5/2019 | Stigwall | G01B 11/2545 |
| 10,415,958 B2* | 9/2019 | Nakatsukasa | G06T 7/70 |
| 10,630,890 B2* | 4/2020 | Chang | G01B 11/2518 |
| 2003/0067461 A1 | 4/2003 | Fletcher | |
| 2009/0040532 A1 | 2/2009 | Kawasaki et al. | |
| 2010/0302558 A1 | 12/2010 | Lin et al. | |
| 2012/0092654 A1 | 4/2012 | De Sloovere | |
| 2017/0224272 A1 | 8/2017 | Liu et al. | |

FOREIGN PATENT DOCUMENTS

| | | |
|---|---|---|
| CN | 106091984 A | 11/2016 |
| CN | 106524917 A | 3/2017 |
| CN | 106568394 A | 4/2017 |
| CN | 106802138 A | 6/2017 |

OTHER PUBLICATIONS

Guo, Cuicui <Research on Calibration Technology of 3D Vision Reconstruction System Based on Parallel Mechanism> Jul. 15, 2010.

* cited by examiner

THREE-DIMENSIONAL RECONSTRUCTION METHOD AND DEVICE BASED ON MONOCULAR THREE-DIMENSIONAL SCANNING SYSTEM

TECHNICAL FIELD

The present disclosure relates to the field of three-dimensional scanning, and in particular to a three-dimensional reconstruction method and device based on a monocular three-dimensional scanning system.

BACKGROUND

Three-dimensional digital technology is a new cross-disciplinary field actively researched in the world in recent years, and has been widely applied in many fields such as reverse engineering, cultural relics protection, industrial inspection and virtual reality. Hand-held portable three-dimensional scanners are widely used in the field of three-dimensional scanning for the advantages of convenience and flexibility. The principle of existing hand-held three-dimensional scanners is mainly based on active stereo vision of structured light. And there are various structured light modes, such as infrared laser speckles, Digital Light Processing (DLP) projection speckles, simulated laser stripes of DLP projection, laser stripes, etc. Among these structured light modes, a hand-held three-dimensional scanner having the simulated laser stripes of DLP projection and the laser stripes serving as the structured light has the highest accuracy and the finest scanning details. A basic workflow is as follows by taking the simulated laser stripes of DLP projection and laser stripes as structured light.

At step one, plane fitting is conducted on projected stripes.

At step two, mark point extraction and stripe center extraction are conducted according to acquired stripe patterns.

At step three, connected domain division is conducted on a stripe center, and points corresponding to stripes in left and right camera images are matched according to a plane equation.

At step four, a center of each mark point, which corresponds to the left and right camera images, are found by means of a limit-restraint relationship of two cameras.

At step five, three-dimensional reconstruction is conducted on matched corresponding stripes and corresponding centers of the mark points with a three-dimensional reconstruction algorithm according to calibration parameters of a scanning system.

At step six, mark point stitching and three-dimensional point rotation and translation of the stripes are conducted to achieve hand-held three-dimensional scanning.

Corresponding stripe matching of the left and right camera images in the above process is mainly based on a guidance of a stripe plane equation. When the number of stripes is greater than 15, a matching error rate of corresponding stripes in the left and right camera images can be significantly increased, and then noise increases and the accuracy of scanning data decreases. When the number of stripes is less than 15, scanning efficiency cannot be effectively improved. Therefore, an effective way for increasing scanning efficiency under a limitation of an inherent scanning frame rate is to increase the number of stripes while improving the accuracy of stripe matching.

However, in the existing hand-held multi-stripe binocular three-dimensional scanning technology, during a scanning process, as the number of stripes increases, a error rate of corresponding point matching increases, resulting in an increase in scanning data miscellaneous points. Moreover, before executing the scanning process, the light plane needs to be calibrated, and requirements for equipment installation accuracy and stability of a system are higher. In addition, as the number of stripes increases, a search complexity of corresponding stripes in the left and right images rapidly increases. Further, the number of stripes is limited, and the full range of the field of view of the cameras cannot be fully utilized, thereby making the increase of scanning efficiency impossible. Due to binocular occlusion, three-dimensional reconstruction cannot be achieved for part of a measured object which is blocked; and due to the use of binocular stereo vision, parallax discontinuity is caused when a surface of the measured object is step-like, resulting in mismatching.

For a problem of occlusion during three-dimensional reconstruction by using binocular stereo vision, there is yet no effective solution at present.

SUMMARY

At least some embodiments of the present disclosure provide a three-dimensional reconstruction method and device based on a monocular three-dimensional scanning system, so as at least to partially solve a technical problem of occlusion during three-dimensional reconstruction by using binocular stereo vision.

In one embodiment of the present disclosure, a three-dimensional reconstruction method based on a monocular three-dimensional scanning system is provided. The monocular three-dimensional scanning system includes an invisible structured light scanning component, a camera and projecting equipment. The method includes: collecting a depth map of a measured object by using the invisible structured light scanning component, and converting the depth map into a three-dimensional data point set, and the three-dimensional data point set includes a plurality of three-dimensional points; determining a target light plane equation corresponding to a target three-dimensional point in the plurality of three-dimensional points; projecting the target three-dimensional point onto a modulated multi-line stripe image, and determining a target stripe corresponding to the target light plane equation in the modulated multi-line stripe image, and the modulated multi-line stripe image is an image collected by the camera after a multi-line stripe image is projected onto the measured object by the projecting equipment; and obtaining a three-dimensional point reconstructed by the target stripe in a camera coordinate system according to the target light plane equation and center coordinates of the target stripe.

Optionally, before collecting the depth map of the measured object by using the invisible structured light scanning component, and converting the depth map into the three-dimensional data point set, the method further includes: calibrating the monocular three-dimensional scanning system to obtain the structural parameters of the monocular three-dimensional scanning system.

Optionally, calibrating the monocular three-dimensional scanning system to obtain the structural parameters of the monocular three-dimensional scanning system includes: calibrating the camera to obtain internal and external parameters of the camera; obtaining a rotation and translation matrix corresponding to a relative positional relationship between the invisible structured light scanning component and the camera; and calibrating a light plane equation corresponding to each stripe in the multi-line stripe image to obtain a plurality of calibrated light plane equations.

Optionally, determining the target light plane equation corresponding to the target three-dimensional point in the plurality of three-dimensional points includes: obtaining Euclidean distances from the target three-dimensional point to each of the plurality of calibrated light plane equations, and determining a light plane equation with the shortest Euclidean distance from the plurality of calibrated light plane equations; and determining the light plane equation with the shortest Euclidean distance as the target light plane equation when an Euclidean distance between the target three-dimensional point and the light plane equation with the shortest Euclidean distance is smaller than a predetermined distance.

Optionally, projecting the target three-dimensional point onto the modulated multi-line stripe image, and determining the target stripe corresponding to the target light plane equation in the modulated multi-line stripe image includes: determining whether at least one stripe line segment is within a preset range with a center of the preset range located at a projection point of the target three-dimensional point in the modulated multi-line stripe image, and the stripe line segment is a line segment formed by dividing a connected domain of a center line after extracting the center line from the modulated multi-line stripe image; and determining the stripe line segment as the target stripe corresponding to the target light plane equation when the stripe line segment exists within the preset range with the center of the preset range located at the projection point of the target three-dimensional point in the modulated multi-line stripe image.

Optionally, obtaining the three-dimensional point reconstructed by the target stripe in the camera coordinate system according to the target light plane equation and the center coordinates of the target stripe includes: calculating coordinates of the three-dimensional point according to the following equations:

$$AX_i + BY_i + CZ_i + D = 0$$

$$(u - c_x)/f_x = X_i/Z_i$$

$$(v - c_y)/f_y = Y_i/Z_i$$

and $(X_i, Y_i, Z_i)$ is the coordinates of the three-dimensional point, A, B, C, and D are coefficients of the target light plane equation, (u, v) is central coordinates of the target stripe, $(c_x, c_y)$ is principal point coordinates of the camera, and $f_x$ and $f_y$ are equivalent focal lengths of the camera.

In another embodiment of the present disclosure, a storage medium is further provided, and the storage medium includes at least one stored program, and the at least one stored program runs to control equipment on which the storage medium is located to execute any one of the above-mentioned methods.

In another embodiment of the present disclosure, a processor is further provided, and the processor is configured to run at least one program, and the at least one program runs to execute any one of the above-mentioned methods.

In another embodiment of the present disclosure, a three-dimensional reconstruction device based on a monocular three-dimensional scanning system is further provided. The monocular three-dimensional scanning system includes an invisible structured light scanning component, a camera and projecting equipment. The device includes: a collecting element, configured to collect a depth map of a measured object by using the invisible structured light scanning component, and convert the depth map into a three-dimensional data point set, and the three-dimensional data point set includes a plurality of three-dimensional points; a determining element, configured to determine a target light plane equation corresponding to a target three-dimensional point in the plurality of three-dimensional points; a projecting element, configured to project the target three-dimensional point onto a modulated multi-line stripe image, and determine a target stripe corresponding to the target light plane equation in the modulated multi-line stripe image, and the modulated multi-line stripe image is an image collected by the camera after a multi-line stripe image is projected onto the measured object by the projecting equipment; and an obtaining element, configured to obtain a three-dimensional point reconstructed by the target stripe in a camera coordinate system according to the target light plane equation and the center coordinates of the target stripe.

Optionally, the device further includes: a calibrating component, configured to calibrate the monocular three-dimensional scanning system to obtain the structural parameters of the monocular three-dimensional scanning system before collecting the depth map of the measured object by using the invisible structured light scanning component and converting the depth map into the three-dimensional data point set.

In at least some embodiments of the present disclosure, the target light plane equation corresponding to the target three-dimensional point in the three-dimensional data point set converted from the depth map can be determined according to the depth map of the measured object collected by the invisible structured light scanning component, the target stripe corresponding to the target light plane equation in the modulated multi-line stripe image collected by the single camera can be determined, and then the three-dimensional point reconstructed by the target stripe in the camera coordinate system can be obtained according to the target light plane equation and the center coordinates of the target stripe. In this way, the three-dimensional point is accurately reconstructed by using the monocular three-dimensional scanning system, so as to complete three-dimensional scanning. The situation that due to the adoption of binocular stereo vision in a binocular three-dimensional scanning system, parallax discontinuity is caused when the surface of the measured object is step-like is avoided. The situation that part of the measured object is blocked, making dual cameras of the binocular scanning system unable to collect the image of the blocked portion, further resulting in failure in three-dimensional reconstruction of the blocked portion is avoided. And the technical problem of occlusion during three-dimensional reconstruction by using binocular stereo vision is solved.

BRIEF DESCRIPTION OF THE DRAWINGS

The drawings described herein are provided to provide a further understanding of the present disclosure, and constitute a part of the present disclosure. The exemplary embodiments of the present disclosure and descriptions of the exemplary embodiments are used for explaining the present disclosure, and do not constitute improper limitations of the present disclosure. In the drawings.

DETAILED DESCRIPTION

In order to make those skilled in the art better understand the solutions of the present disclosure, technical solutions in embodiments of the present disclosure will be described clearly and completely in the following with reference to the accompanying drawings in the embodiments of the present disclosure. Obviously, described embodiments are a part of the embodiments of the present disclosure, rather than all the embodiments. All other embodiments obtained by the skilled person in the art based on the embodiments of the present disclosure without creative efforts shall fall within the protection scope of the present disclosure.

It should be noted that the terms "first", "second", and the like in the specification and claims of the present disclosure and the foregoing drawings are used to distinguish similar objects and do not necessarily describe a specific sequence or order. It should be understood that the data used as such may be interchanged where appropriate so that the embodiments of the present disclosure described herein can be implemented in other than the order illustrated or described herein. In addition, the terms "include" and "have" and any variations of the terms are intended to cover non-exclusive inclusions. For example, a process, method, system, product, or apparatus that includes a series of steps or elements need not be limited to those steps or elements that are clearly listed, but may include other steps or elements that are not explicitly listed or inherent to these processes, methods, products, or apparatuses.

In one embodiment of the present disclosure, a three-dimensional reconstruction method based on a monocular three-dimensional scanning system is provided. It should be noted that the steps shown in the flowchart of the drawings may be executed in a computer system such as a group of computer-executable instructions. Moreover, although the logical sequence is shown in the flowchart, in some cases, the illustrated or described steps may be performed in an order other than this.

Figure 1:
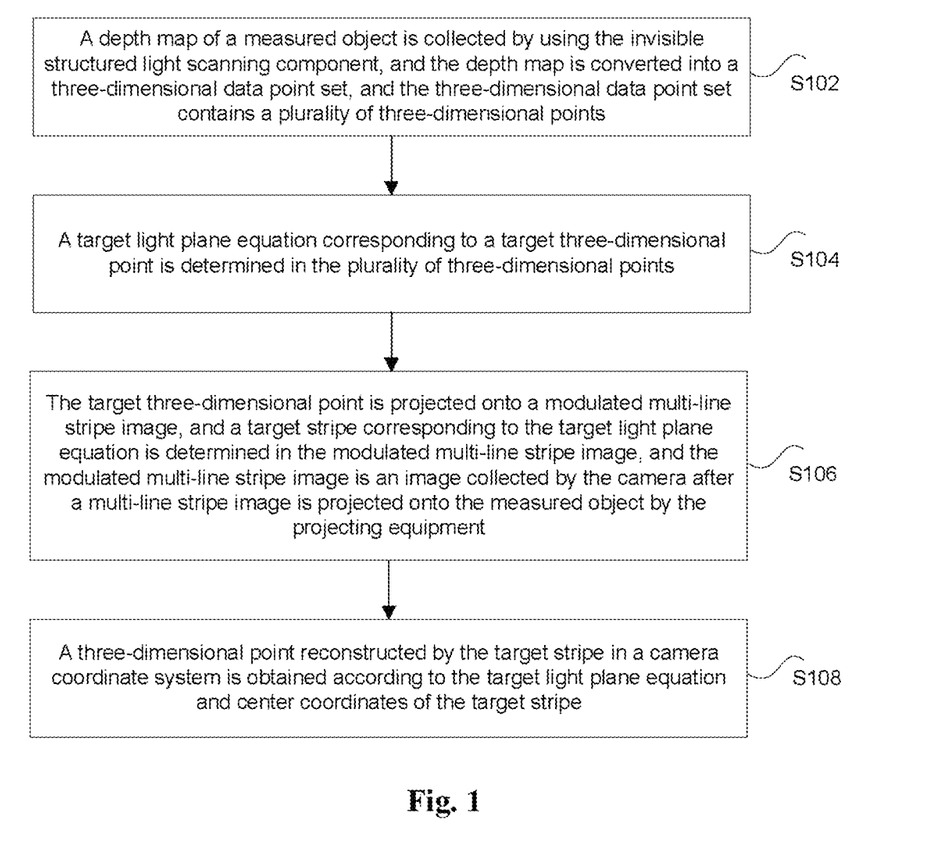
FIG. 1 is a flowchart of an optional three-dimensional reconstruction method based on a monocular three-dimensional scanning system according to an embodiment of the present disclosure.

In this embodiment of the present disclosure, the monocular three-dimensional scanning system raised in the three-dimensional reconstruction method based on the monocular three-dimensional scanning system includes: an invisible structured light scanning component, a camera and projecting equipment. FIG. 1 is a flowchart of an optional three-dimensional reconstruction method based on a monocular three-dimensional scanning system according to an embodiment of the present disclosure. As shown in FIG. 1, the method includes the following steps.

At Step S102: a depth map of a measured object is collected by using the invisible structured light scanning component, and the depth map is converted into a three-dimensional data point set, and the three-dimensional data point set contains a plurality of three-dimensional points.

At Step S104: a target light plane equation corresponding to a target three-dimensional point is determined in the plurality of three-dimensional points.

At Step S106: the target three-dimensional point is projected onto a modulated multi-line stripe image, and a target stripe corresponding to the target light plane equation is determined in the modulated multi-line stripe image, and the modulated multi-line stripe image is an image collected by the camera after a multi-line stripe image is projected onto the measured object by the projecting equipment.

At Step S108: a three-dimensional point reconstructed by the target stripe in a camera coordinate system is obtained according to the target light plane equation and center coordinates of the target stripe.

By means of the above steps, the target light plane equation corresponding to the target three-dimensional point in the three-dimensional data point set converted from the depth map can be determined according to the depth map of the measured object acquired by the invisible structured light scanning component, the target stripe corresponding to the target light plane equation in the modulated multi-line stripe image collected by the single camera can be determined, and then the three-dimensional point reconstructed by the target stripe in the camera coordinate system can be obtained according to the target light plane equation and the center coordinates of the target stripe. In this way, the three-dimensional point is accurately reconstructed by using the monocular three-dimensional scanning system, so as to complete three-dimensional scanning. The situation that due to the adoption of binocular stereo vision in a binocular three-dimensional scanning system, parallax discontinuity is caused when the surface of the measured object is step-like is avoided. The situation that part of the measured object is blocked, making dual cameras of the binocular scanning system unable to acquire the image of the blocked portion, further resulting in failure in three-dimensional reconstruction of the blocked portion is avoided. And the technical problem of occlusion during three-dimensional reconstruction by using binocular stereo vision is solved.

Optionally, the projecting equipment may be a digital projector, and the corresponding projected multi-line stripe image may be a digital simulation laser multi-line stripe image. And the digital simulation laser multi-line stripe image may be generated by a computer in the monocular three-dimensional scanning system and projected by the digital projector onto the measured object. Optionally, the projecting equipment may also be a laser projecting device, the corresponding projected multi-line stripe image may be a laser multi-line stripe image. And the laser multi-line stripe image may be directly projected onto the measured object by the laser projecting device. It should be noted here that the embodiments of the present disclosure are illustrated by taking the projecting equipment as a digital projector and the projected multi-line stripe image as a digital multi-line stripe image, but the projecting equipment is not limited to the digital projector and the projected multi-line stripe image is not limited to a digital multi-line stripe image.

In an optional embodiment, before acquiring the depth map of the measured object by using the invisible structured light scanning component, and converting the depth map into the three-dimensional data point set, the method in this optional embodiment may further include the following step: The monocular three-dimensional scanning system is calibrated to obtain structural parameters of the monocular three-dimensional scanning system.

Optionally, the invisible structured light scanning component may be an infrared structured light scanning component.

With the above embodiment of the present disclosure, the monocular three-dimensional scanning system may be calibrated first to obtain the structural parameters of the monocular three-dimensional scanning system, so that the three-dimensional point can be accurately reconstructed according to the accurate structural parameters obtained after calibrating the monocular three-dimensional scanning system.

In an optional embodiment, an operation of calibrating the monocular three-dimensional scanning system to obtain the structural parameters of the monocular three-dimensional scanning system includes the following steps:

The camera is calibrated to obtain the internal and external parameters of the camera. A rotation and translation matrix corresponding to a relative positional relationship between the invisible structured light scanning component and the camera is obtained. And a light plane equation corresponding to each stripe in the multi-line stripe image is calibrated to obtain a plurality of calibrated light plane equations.

With the above embodiment of the present disclosure, in a process of calibrating the monocular three-dimensional scanning system, the internal and external parameters of the camera may be obtained by calibrating the camera. The rotation and translation matrix corresponding to the relative positional relationship between the invisible structured light scanning component and the camera may be obtained by calibrating the relative positional relationship between the invisible structured light scanning component and the camera. And the plurality of calibrated light plane equations may be obtained by calibrating the light plane equation corresponding to each stripe in the multi-line stripe image, so as to accurately reconstruct the three-dimensional point according to the internal and external parameters of the camera, the rotation and translation matrix and the light plane equations.

In an optional embodiment, an operation of determining a target light plane equation corresponding to a target three-dimensional point in the plurality of three-dimensional points includes the following steps:

Euclidean distances from the target three-dimensional point to each of the plurality of calibrated light plane equations are obtained, and a light plane equation with the shortest Euclidean distance is determined from the plurality of calibrated light plane equations. And the light plane equation with the shortest Euclidean distance is determined as the target light plane equation when a Euclidean distance between the target three-dimensional point and the light plane equation with the shortest Euclidean distance is smaller than a predetermined distance.

With the above embodiment of the present disclosure, by obtaining the Euclidean distances from the target three-dimensional point to each of the plurality of calibrated light plane equations and determining the light plane equation with the shortest Euclidean distance from the plurality of calibrated light plane equations, the light plane equation with the shortest Euclidean distance may be determined as the target light plane equation when the Euclidean distance between the target three-dimensional point and the light plane equation with the shortest Euclidean distance is smaller than the predetermined distance, so as to accurately reconstruct the three-dimensional point according to the target light plane equation.

In an optional embodiment, an operation of projecting the target three-dimensional point onto the modulated multi-line stripe image, and determining the target stripe corresponding to the target light plane equation in the modulated multi-line stripe image includes the following steps:

Whether at least one stripe line segment is within a preset range with a center of the preset located at a projection point of the target three-dimensional point in the modulated multi-line stripe image is determined, and the stripe line segment is a line segment formed by dividing a connected domain of a center line after extracting the center line from the modulated multi-line stripe image. And the stripe line segment is determined as the target stripe corresponding to the target light plane equation when the stripe line segment exists within the preset range with the center of the preset range located at the projection point of the target three-dimensional point in the modulated multi-line stripe image.

With the above embodiment of the present disclosure, by determining whether a stripe line segment, which is a line segment formed by dividing the connected domain of the center line after extracting the center line from the modulated multi-line stripe image, is within the preset range with the center of the preset range located at the projection point of the target three-dimensional point in the modulated multi-line stripe image, the stripe line segment is determined as the target stripe corresponding to the target light plane equation when the stripe line segment exists within the preset range with the center of the preset range located at the projection point of the target three-dimensional point in the modulated multi-line stripe image, so that the target stripe corresponding to the target light plane equation in stripe line segments may be determined, and the corresponding target stripe may be calculated with the target light plane equation so as to accurately reconstruct the three-dimensional point.

In an optional embodiment, an operation of obtaining a three-dimensional point reconstructed by the target stripe in the camera coordinate system according to the target light plane equation and the center coordinates of the target stripe includes the following step:

Coordinates of the three-dimensional point is calculated according to the following equations:

$$AX_i + BY_i + CZ_i + D = 0$$

$$(u - c_x)/f_x = X_i/Z_i$$

$$(v - c_y)/f_y = Y_i/Z_i$$

and $(X_i, Y_i, Z_i)$ is the coordinates of the three-dimensional point, A, B, C, and D are coefficients of the target light plane equation, (u, v) is central coordinates of the target stripe, $(c_x, c_y)$ is principal point coordinates of the camera, and $f_x$ and $f_y$ are equivalent focal lengths of the camera.

With the above embodiment of the present disclosure, based on the coefficients of the target light plane equation, (u, v) as the central coordinates of the target stripe, $(c_x, c_y)$ as the principal point coordinates of the camera, and $f_x$ and $f_y$ as the equivalent focal lengths of the camera, the coordinates of the three-dimensional point $(X_i, Y_i, Z_i)$ can be obtained accurately, so as to accurately reconstruct the three-dimensional point.

In an exemplary embodiment of the present disclosure, a monocular multi-line three-dimensional scanning method based on combination of structured light of different wavebands is provided.

This exemplary embodiment of the present disclosure mainly takes the technical improvement of the combination of an invisible light waveband (namely infrared structured light) three-dimensional component and monocular visible light multi-line stripes as an example. This exemplary embodiment of the present disclosure aims to use three-dimensional data reconstructed by the infrared structured light three-dimensional component to indicate the three-dimensional reconstruction of the monocular multi-line stripes. The key of this exemplary embodiment is that the three-dimensional reconstruction data of the infrared structured light three-dimensional component indicates the accurate matching of the monocular multi-line stripes and light plane equations, so as to improve the matching accuracy of multiple stripes, increase the number of matching stripes, and further improve the scanning efficiency of a hand-held three-dimensional scanning system. For a camera with a 1.3-megapixel resolution, up to 100 stripes may be matched, and under the same frame rate and camera resolution, scanning efficiency is improved by 10 times or more compared with the related art. At the same time, multi-stripe scanning can be realized without using mark points, and real-time splicing can be achieved based on features.

The technical solution provided by the present disclosure includes the following parts: a equipment construction part, a system calibration part, a digital projection and image collection part, a determination of the serial number of a point set (PtS) associated with light plane equations part, an indication of the matching of corresponding stripes in a multi-line stripe image part, and a three-dimensional reconstruction part.

Optionally, a three-dimensional digital imaging sensor composed of an infrared structured light three-dimensional scanning component, a camera and a digital projector is constructed, and relative positions of the infrared structured light three-dimensional scanning component, the camera and the digital projector are fixed. And a measured object is placed within a measurement range.

Optionally, the system calibration part includes the following step:

The camera is calibrated to obtain internal and external parameters, including an internal parameter A, external parameters R and T, of the camera, and a rotation and translation matrix Ms corresponding to a relative positional relationship between the infrared structured light three-dimensional scanning component and the camera is simultaneously calibrated.

Optionally, the system calibration part further includes the following step:

Light plane calibration is performed on multi-line stripes, to calibrate a light plane equation corresponding to each stripe. The light plane equation is as follows: plane(i)=$\{AX_i+BY_i+CZ_i+D=0\}$, and $(X_i, Y_i, Z_i)$ is a three-dimensional point reconstructed by a stripe line segment in a camera coordinate system.

Figure 2:
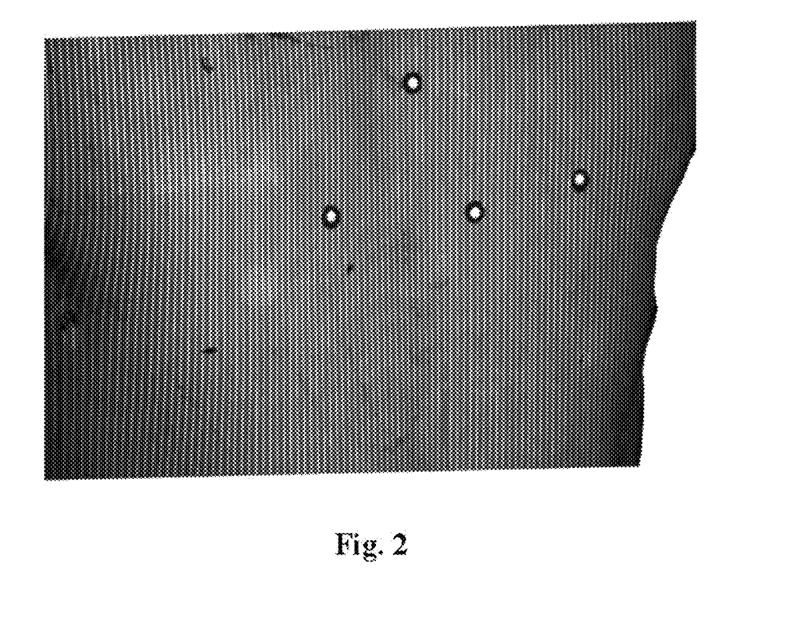
FIG. 2 is a schematic diagram of an optional multi-line stripe demodulation pattern according to an embodiment of the present disclosure.

FIG. 2 is a schematic diagram of an optional multi-line stripe demodulation pattern according to an embodiment of the present disclosure. As shown in FIG. 2, a digital multi-line stripe pattern with the number of stripes greater than 15 (the maximum number of stripes may be 100 or more) is generated by a computer. The digital projector conducts projection onto the measured object. A digital laser pattern is deformed by performing height modulation to the measured object to generate a modulated digital multi-line stripe pattern. The camera synchronously collects the modulated digital multi-line stripe pattern.

Optionally, the serial number of the point set (PtS) associated with light plane equations may be determined. And after obtaining the three-dimensional data PtS of the infrared structured light three-dimensional scanning component, a Euclidean distance between each three-dimensional point pt(i) (namely target three-dimensional point) in the three-dimensional point set (PtS) and each light plane equation is calculated in sequence. And it is assumed that a distance threshold vTH is set to be 0.5 mm, a distance between pt(i) and the nth light plane equation is the shortest and within the range of the threshold vTH, the nth light plane equation corresponding to the three-dimensional point pt(i) is reserved and recorded at the same time. Otherwise, pt(i) is deleted when pt(i) may not be associated with any light plane equation. At this moment, each three-dimensional point in the point set (PtS) corresponds to a light plane equation.

Figure 3:
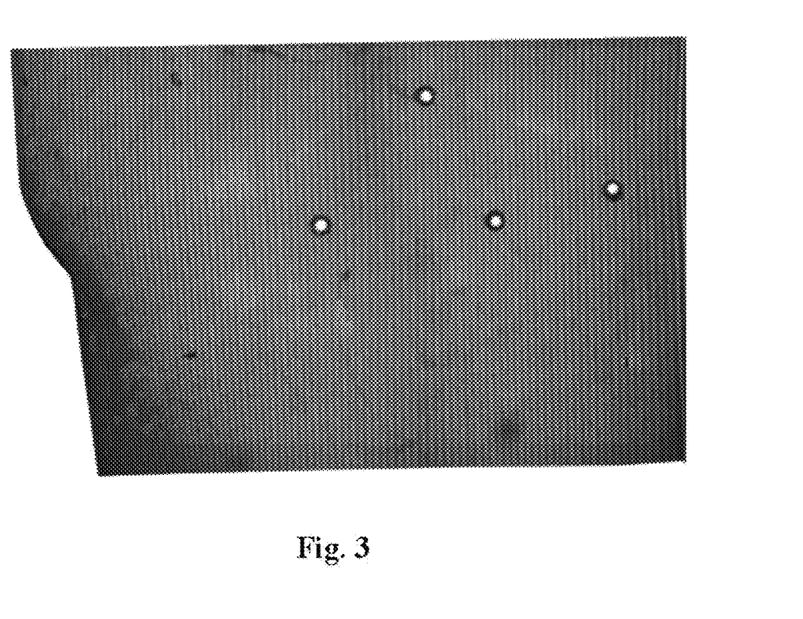
FIG. 3 is a schematic diagram of optional stripe line segment division and three-dimensional component point cloud back projection according to an embodiment of the present disclosure.

FIG. 3 is a schematic diagram of optional strip line segment division and three-dimensional component point cloud back projection according to an embodiment of the present disclosure. As shown in FIG. 3, multiple independent line segments are formed by extracting at least one center line from the modulated multi-line stripe pattern and then dividing a connected domain of each center line. After that, pt(i) in the three-dimensional data PtS of the infrared structured light three-dimensional component is sequentially projected onto a demodulated multi-line stripe image according to at least one calibrated internal parameter of the camera. And when a projection point of pt(i) has an independent line segment of multiple-line stripes within eight neighboring domains, the independent line segment (namely a target stripe) of the multi-line stripes is determined corresponding to the nth light plane equation (namely a target light plane equation).

Optionally, the following three equations may be jointly solved so as to obtain the three-dimensional point $(X_i, Y_i, Z_i)$, that is a three-dimensional point reconstructed in the camera coordinate system, of the multi-line stripes. And known quantities include that: (A, B, C, and D) are coefficients of the light plane equation, (u, v) is central coordinates of the target stripe, $(c_x, c_y)$ is principal point coordinates of the camera, and $f_x$ and $f_y$ are equivalent focal lengths.

The three equations are as follows:

$$AX_i+BY_i+CZ_i+D=0$$

$$(u-c_x)/f_x=X_i/Z_i$$

$$(v-c_y)/f_y=Y_i/Z_i.$$

Figure 4:
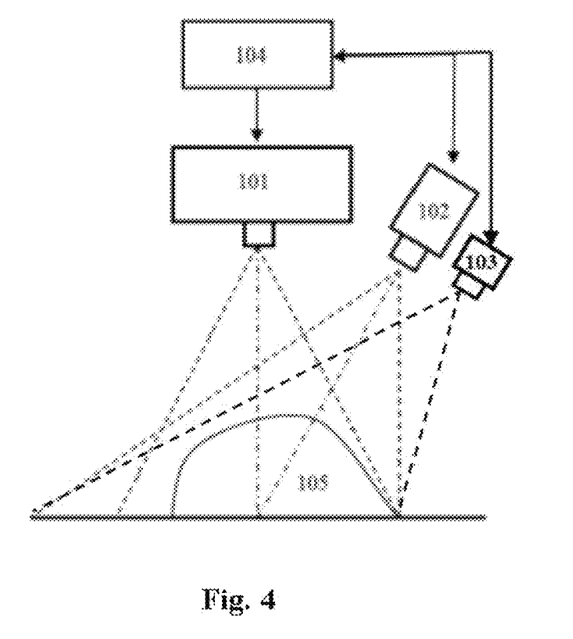
FIG. 4 is a schematic diagram of a structure of an optional three-dimensional scanning system formed by combination of a three-dimensional hand-held infrared structured light three-dimensional component and monocular multiple stripes according to an embodiment of the present disclosure.

FIG. 4 is a schematic diagram of a structure of an optional three-dimensional scanning system formed by combination of a three-dimensional hand-held infrared structured light three-dimensional component and monocular multiple stripes according to an embodiment of the present disclosure. As shown in FIG. 4, the system includes: a digital projector 101, a camera 102, an infrared structured light three-dimensional component 103, a computer 104, and a measured sample 105.

Optionally, an internal parameter of the camera is as follows:

$$K1 = [2271.084 \quad 0 \quad 645.632$$
$$0 \quad 2265.112 \quad 511.53$$
$$0 \quad 0 \quad 1].$$

Optionally, external parameters of the camera are as follows:

$$R = \begin{bmatrix} -0.0917752 & -0.942911 & -0.32015 \\ 0.879959 & 0.0736946 & -0.469298 \\ 0.4661 & -0.324789 & 0.82296 \end{bmatrix};$$

$$T = [-1.77 \quad -5.5 \quad 450].$$

Optionally, an internal parameter of the infrared structured light three-dimensional component is as follows:

$$Ks = \begin{bmatrix} 476.927, & 0 & 312.208, \\ 0, & 475.927, & 245.949, \\ 0, & 0, & 1 \end{bmatrix}.$$

Optionally, system structural parameters between the infrared structured light three-dimensional component and the camera are as follows:

$$Rs = \begin{bmatrix} 0.9989 & 0.0445 & -0.0113 \\ -0.0454 & 0.9928 & -0.1109 \\ 0.0063 & 0.1113 & 0.9938 \end{bmatrix};$$

$$Ts = [91.3387 \quad 28.1183 \quad 1.7905].$$

As mentioned above, light plane equations of pre-calibrated multi-line stripes are as follows: plane(i)={AXi+BYi+CZi+D=0}. A DLP is configured to project multi-line stripes of at least one visible light band on the measured sample. While the DLP is configured to trigger the infrared structured light three-dimensional component to collect three-dimensional data of the measured sample, the DLP is further configured to trigger the camera to collect the multi-line stripes. The DLP is further configured to extract a center line from the collected demodulated multi-line stripe pattern and divide a connected domain of the center line. The DLP is further configured to calculate distances between the three-dimensional data of the infrared three-dimensional component and the light plane equations, and when a distance between three-dimensional data of the infrared three-dimensional component and a light plane equation, is within the distance threshold, a serial number of this light plane equation is reserved and recorded. The DLP is further configured to back-project the three-dimensional data onto an image plane of the camera, and when there is an intersection between the three-dimensional data and a multi-line stripe line segment, the light plane equation corresponding to the multi-line stripe line segment is determined. The three-dimensional data of the multi-line stripes is calculated by using multi-line stripe image coordinates and the corresponding light plane equation according to the calibrated camera parameters.

According to the technical solution provided by the present disclosure, the invisible structured light waveband three-dimensional reconstruction data can be used to indicate the monocular three-dimensional reconstruction of visible light waveband structured light. Accurate matching of the visible light monocular multi-line stripes and the corresponding light plane equations can be achieved. The three-dimensional reconstruction data of the invisible light three-dimensional component can be used to determine the light plane equations. And monocular multi-stripe scanning can be realized without using mark points, and real-time splicing can be achieved based on features.

The technical solution provided by the present disclosure can simplify the matching of the monocular multiple stripes and the corresponding light plane equations, and improve the accuracy of matching. At the same time, the limitation of the number of projected stripes in the related art is eliminated, and the scanning rate can be increased by 10 or more times under the same conditions. Through the monocular three-dimensional reconstruction method, the problem of occlusion of binocular stereo vision is solved. Cooperative scanning of structured light of different wavebands is realized.

In another embodiment of the present disclosure, a storage medium is further provided. The storage medium includes at least one stored program, and the at least one stored program runs to control equipment on which the storage medium is located to execute the three-dimensional reconstruction method based on the monocular three-dimensional scanning system.

In another embodiment of the present disclosure, a processor is further provided. The processor is configured to run at least one program, and the at least one program runs to execute the three-dimensional reconstruction method based on the monocular three-dimensional scanning system.

In another embodiment of the present disclosure, a three-dimensional reconstruction device based on a monocular three-dimensional scanning system is also provided. It should be noted that the three-dimensional reconstruction device based on the monocular three-dimensional scanning system is configured to execute the three-dimensional reconstruction method based on the monocular three-dimensional scanning system in the embodiments of the present disclosure, and the three-dimensional reconstruction method based on the monocular three-dimensional scanning system in the embodiments of the present disclosure may be performed in the three-dimensional reconstruction device based on the monocular three-dimensional scanning system.

Figure 5:
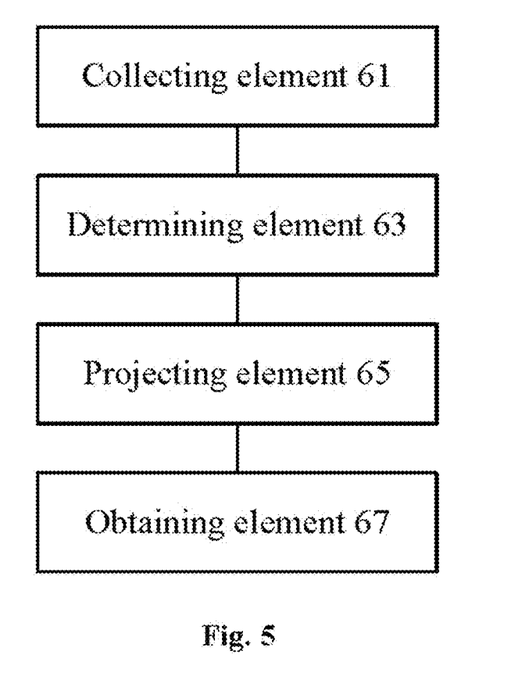
FIG. 5 is a schematic diagram of an optional three-dimensional reconstruction device based on a monocular three-dimensional scanning system according to an embodiment of the present disclosure.

The monocular three-dimensional scanning system raised in the three-dimensional reconstruction device based on the monocular three-dimensional scanning system includes: an invisible structured light scanning component, a camera and projecting equipment. FIG. 5 is a schematic diagram of an optional three-dimensional reconstruction device based on a monocular three-dimensional scanning system according to an embodiment of the present disclosure. As shown in FIG. 5, the device includes:

an collecting element 61, configured to collect a depth map of a measured object by using the invisible structured light scanning component to, and convert the depth map into a three-dimensional data point set, and the three-dimensional data point set includes a plurality of three-dimensional points;

a determining element 63, configured to determine a target light plane equation corresponding to a target three-dimensional point in the plurality of three-dimensional points;

a projecting element 65, configured to project the target three-dimensional point onto a modulated multi-line stripe image, and determine a target stripe corresponding to the target light plane equation in the modulated multi-line stripe image, and the modulated multi-line stripe image is an image collected by the camera after a multi-line stripe image is projected onto the measured object by the projecting equipment; and an obtaining element 67, configured to obtain a three-dimensional point reconstructed by the target stripe in a camera coordinate system according to the target light plane equation and the center coordinates of the target stripe.

It should be noted that the collecting element 61 in this embodiment is configured to execute step S102 in above-mentioned embodiment of the present disclosure, the determining element 63 in this embodiment is configured to execute step S104 in above-mentioned embodiment of the present disclosure, the projecting element 65 in this embodiment is configured to execute step S106 in above-mentioned embodiment of the present disclosure, and the obtaining element 6 in this embodiment is configured to execute step S108 in above-mentioned embodiment of the present disclosure. The above components and the corresponding steps implement the same examples and application scenarios, but are not limited to the content disclosed in the above-mentioned embodiment.

According to the above-mentioned embodiment of the present disclosure, the target light plane equation corresponding to the target three-dimensional point in the three-dimensional data point set converted from the depth map can be determined according to the depth map of the measured object collected by the invisible structured light scanning component, the target stripe corresponding to the target light plane equation in the modulated multi-line stripe image collected by the single camera can be determined, and then the three-dimensional point reconstructed by the target stripe in the camera coordinate system can be obtained according to the target light plane equation and the center coordinates of the target stripe. In this way, the three-dimensional point is accurately reconstructed by using the monocular three-dimensional scanning system, so as to complete three-dimensional scanning. The situation that due to the adoption of binocular stereo vision in a binocular three-dimensional scanning system, parallax discontinuity is caused when the surface of the measured object is step-like is avoided. The situation that part of the measured object is blocked, making dual cameras of the binocular scanning system unable to collect the image of the blocked portion, further resulting in failure in three-dimensional reconstruction of the blocked portion is avoided. And the technical problem of occlusion during three-dimensional reconstruction by using binocular stereo vision is solved.

In an optional embodiment, the device further includes: a calibrating component, configured to calibrate the monocular three-dimensional scanning system to obtain the structural parameters of the monocular three-dimensional scanning system before collecting the depth map of the measured object by using the invisible structured light scanning component and converting the depth map into the three-dimensional data point set.

In an optional embodiment, the calibrating component includes: a first calibrating subcomponent, configured to calibrate the camera to obtain internal and external parameters of the camera; a first obtaining component, configured to obtain a rotation and translation matrix corresponding to a relative positional relationship between the invisible structured light scanning component and the camera; and a second calibrating subcomponent, configured to calibrate a light plane equation corresponding to each stripe in the multi-line stripe image to obtain a plurality of calibrated light plane equations.

In an optional embodiment, the determining element includes: a second obtaining component, configured to obtain Euclidean distances from the target three-dimensional point to each of the plurality of calibrated light plane equations, and determine a light plane equation with the shortest Euclidean distance from the plurality of calibrated light plane equations; and a first determining element, configured to determine the light plane equation with the shortest Euclidean distance as the target light plane equation when a Euclidean distance between the target three-dimensional point and the light plane equation with the shortest Euclidean distance is smaller than a predetermined distance.

In an optional embodiment, the projecting element includes: a determining component, configured to determining whether at least one stripe line segment is within a preset range with a center of the preset range located at a projection point of the target three-dimensional point in the modulated multi-line stripe image, and the stripe line segment is a line segment formed by dividing a connected domain of a center line after extracting the center line from the modulated multi-line stripe image; and a second determining component, configured to determine the stripe line segment as the target stripe corresponding to the target light plane equation when the stripe line segment exists within the preset range with the center of the preset range located at the projection point of the target three-dimensional point in the modulated multi-line stripe image.

As an optional embodiment, the obtaining element includes: a calculating component, configured to calculate coordinates of the three-dimensional point according to the following equations: $AX_i + BY_i + CZ_i + D = 0$ $$(u-c_x)/f_x = X_i/Z_i$$

$$(v-c_y)/f_y = Y_i/Z_i$$

and $(X_i, Y_i, Z_i)$ is the coordinates of the three-dimensional point, A, B, C, and D are coefficients of the target light plane equation, $(u, v)$ is central coordinates of the target stripe, $(c_x, c_y)$ is principal point coordinates of the camera, and $f_x$ and $f_y$ are equivalent focal lengths of the camera.

The sequence numbers of the foregoing embodiments of the present disclosure are for description and do not represent the advantages and disadvantages of the embodiments.

In the foregoing embodiments of the present disclosure, the description of each embodiment has its own emphasis, for the part not described in detail in one embodiment, reference may be made to the relevant description of other embodiments.

In the several embodiments provided by the present disclosure, it should be understood that the disclosed technical content may be implemented in other manners. The device embodiments described above are schematic. For one example, the division of the elements is one logical function division, and there may be another division manner in actual implementation. For another example, multiple elements or components may be combined or may be integrated into another system, or some features can be ignored or not implemented. In addition, the illustrated or discussed mutual coupling or direct coupling or communication may be indirect coupling or communication through some interfaces, elements or components, and may be electrical or other forms.

The elements described as separate parts may or may not be physically separated, and the parts displayed as elements may or may not be physical elements, that is, may be located in one place, or may be distributed on multiple elements. Some or all of the elements may be selected according to actual needs to achieve the purpose of the solution of this embodiment.

In addition, the functional elements in each embodiment of the present disclosure may be integrated in one processing element, or each element may exist alone physically, or two or more elements may be integrated in one element. The above integrated element can be implemented either in the form of hardware or in the form of a software functional element.

The integrated element, if implemented in the form of a software functional element and sold or used as a stand-alone product, may be stored in a computer-readable storage medium. Based on such understanding, the technical solution may be essentially, or the part of the present disclosure which contributes to the related art or all or part of the technical solution may be embodied in the form of a software product, and the computer software product is stored in a storage medium and includes a plurality of instructions for causing a computer device (which may be personal computers, servers or network devices, etc.) to perform all or part of the steps of the methods described in the various embodiments of the present disclosure. The foregoing storage medium may include a USB flash disk, a read-only memory (ROM), a random access memory (RAM), a removable hard disk, a magnetic disk, a light disk and various other media which can store program codes.

The above description are exemplary embodiments of the present disclosure, and it should be pointed out that those of ordinary skill in the art can make various improvements and modifications without departing from the principle of the present disclosure, and these improvements and modifications should also be regarded as the protection scope of the present disclosure.

INDUSTRIAL APPLICABILITY

As described above, the three-dimensional reconstruction method and device based on the monocular three-dimensional scanning system provided by the embodiments of the present disclosure have the following beneficial effect: by using the monocular three-dimensional scanning system to accurately reconstruct the three-dimensional point so as to complete three-dimensional scanning, occlusion during three-dimensional reconstruction using binocular stereo vision is avoided.

What is claimed is:

1. A three-dimensional reconstruction method based on a monocular three-dimensional scanning system, wherein the monocular three-dimensional scanning system comprises an invisible structured light scanning component, a camera and projecting equipment, and the method comprises:
    collecting a depth map of a measured object by using the invisible structured light scanning component, and converting the depth map into a three-dimensional data point set, wherein the three-dimensional data point set comprises a plurality of three-dimensional points;
    determining a target light plane equation corresponding to a target three-dimensional point in the plurality of three-dimensional points;
    projecting the target three-dimensional point onto a modulated multi-line stripe image, and determining a target stripe corresponding to the target light plane equation in the modulated multi-line stripe image, wherein the modulated multi-line stripe image is an image collected by the camera after a multi-line stripe image is projected onto the measured object by the projecting equipment; and
    obtaining a three-dimensional point reconstructed by the target stripe in a camera coordinate system according to the target light plane equation and center coordinates of the target stripe.

2. The method as claimed in claim 1, wherein before collecting the depth map of the measured object by using the invisible structured light scanning component, and converting the depth map into the three-dimensional data point set, the method further comprises:
    calibrating the monocular three-dimensional scanning system to obtain structural parameters of the monocular three-dimensional scanning system.

3. The method as claimed in claim 2, wherein calibrating the monocular three-dimensional scanning system to obtain the structural parameters of the monocular three-dimensional scanning system comprises:
    calibrating the camera to obtain internal and external parameters of the camera;
    obtaining a rotation and translation matrix corresponding to a relative positional relationship between the invisible structured light scanning component and the camera; and
    calibrating a light plane equation corresponding to each stripe in the multi-line stripe image to obtain a plurality of calibrated light plane equations.

4. The method as claimed in claim 3, wherein determining the target light plane equation corresponding to the target three-dimensional point in the plurality of three-dimensional points comprises:
    obtaining Euclidean distances from the target three-dimensional point to each of the plurality of calibrated light plane equations, and determining a light plane equation with the shortest Euclidean distance from the plurality of calibrated light plane equations; and
    determining the light plane equation with the shortest Euclidean distance as the target light plane equation when a Euclidean distance between the target three-dimensional point and the light plane equation with the shortest Euclidean distance is smaller than a predetermined distance.

5. The method as claimed in claim 1, wherein projecting the target three-dimensional point onto the modulated multi-line stripe image, and determining the target stripe corresponding to the target light plane equation in the modulated multi-line stripe image comprises:
    determining whether at least one stripe line segment is within a preset range with a center of the preset range located at a projection point of the target three-dimensional point in the modulated multi-line stripe image, wherein the stripe line segment is a line segment formed by dividing a connected domain of a center line after extracting the center line from the modulated multi-line stripe image; and
    determining the stripe line segment as the target stripe corresponding to the target light plane equation when the stripe line segment exists within the preset range with the center of the preset range located at the projection point of the target three-dimensional point in the modulated multi-line stripe image.

6. The method as claimed in claim 1, wherein obtaining the three-dimensional point reconstructed by the target stripe in the camera coordinate system according to the target light plane equation and the center coordinates of the target stripe comprises:
    calculating coordinates of the three-dimensional point according to the following equations:

$$AX_i+BY_i+CZ_i+D=0$$

$$(u-c_x)/f_x=X_i/Z_i$$

$$(v-c_y)/f_y=Y_i/Z_i$$

wherein ($X_i$, $Y_i$, $Z_i$) is the coordinates of the three-dimensional point, A, B, C, and D are coefficients of the target light plane equation, (u, v) is central coordinates of the target stripe, ($c_x$, $c_y$) is principal point coordinates of the camera, and $f_x$ and $f_y$ are equivalent focal lengths of the camera.

7. A non-transitory computer readable medium containing computer instructions stored therein for causing a computer processor to perform the method as claimed in claim 1.

8. A processor, wherein the processor is configured to run at least one program, wherein the at least one program runs to execute the method as claimed in claim 1.

9. A three-dimensional reconstruction device based on a monocular three-dimensional scanning system, wherein the monocular three-dimensional scanning system comprises an invisible structured light scanning component, a camera and projecting equipment, and the device comprises:
   a collecting element, configured to collect a depth map of a measured object by using the invisible structured light scanning component, and convert the depth map into a three-dimensional data point set, wherein the three-dimensional data point set comprises a plurality of three-dimensional points;
   a determining element, configured to determine a target light plane equation corresponding to a target three-dimensional point in the plurality of three-dimensional points;
   a projecting element, configured to project the target three-dimensional point onto a modulated multi-line stripe image, and determine a target stripe corresponding to the target light plane equation in the modulated multi-line stripe image, wherein the modulated multi-line stripe image is an image collected by the camera after a multi-line stripe image is projected onto the measured object by the projecting equipment; and
   an obtaining element, configured to obtain a three-dimensional point reconstructed by the target stripe in a camera coordinate system according to the target light plane equation and the center coordinates of the target stripe.

10. The device as claimed in claim 9, wherein the device further comprises:
   a calibrating component, configured to calibrate the monocular three-dimensional scanning system to obtain structural parameters of the monocular three-dimensional scanning system before collecting the depth map of the measured object by using the invisible structured light scanning component and converting the depth map into the three-dimensional data point set.

* * * * *